United States Patent
Somoza et al.

(10) Patent No.: US 6,336,035 B1
(45) Date of Patent: Jan. 1, 2002

(54) TOOLS FOR WIRELESS NETWORK PLANNING

(75) Inventors: Vincent E. Somoza, Kanata; Gorete Almeida, Nepean; Paul D. McDonald, Nepean; Peter Hill, Nepean, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/195,556

(22) Filed: Nov. 19, 1998

(51) Int. Cl.7 .................................................. H04Q 7/20
(52) U.S. Cl. ...................... 455/446; 455/67.1; 455/423; 455/456
(58) Field of Search ................................ 455/423, 446, 455/67.7, 67.1, 566, 550, 456

(56) References Cited

U.S. PATENT DOCUMENTS

| | | | | |
|---|---|---|---|---|
| 5,561,841 A | * | 10/1996 | Markus | 455/446 |
| 5,987,306 A | * | 11/1999 | Nilsen et al. | 455/67.1 |
| 5,987,328 A | * | 11/1999 | Ephremides et al. | 455/446 |
| 6,008,808 A | * | 12/1999 | Almeida et al. | 345/339 |
| 6,014,565 A | * | 1/2000 | Bonta | 455/437 |

* cited by examiner

*Primary Examiner*—Curtis Kuntz
*Assistant Examiner*—Barry W. Taylor
(74) *Attorney, Agent, or Firm*—Finnegan, Henderson, Farabow, Garrett & Dunner, L.L.P.

(57) ABSTRACT

Software tools for simulating the planning and operation of one or more cellsites within a wireless network utilize a database of cellsite information such as GPS, topographical, street map, architectural, RF propagation, and end user data. The tools retrieve and manipulate this data through a graphical user interface executed by a computing device. Using the graphical user interface, a user may simulate product information, drive tests, radio frequency propagation data, and user location profiles within a cell.

29 Claims, 13 Drawing Sheets

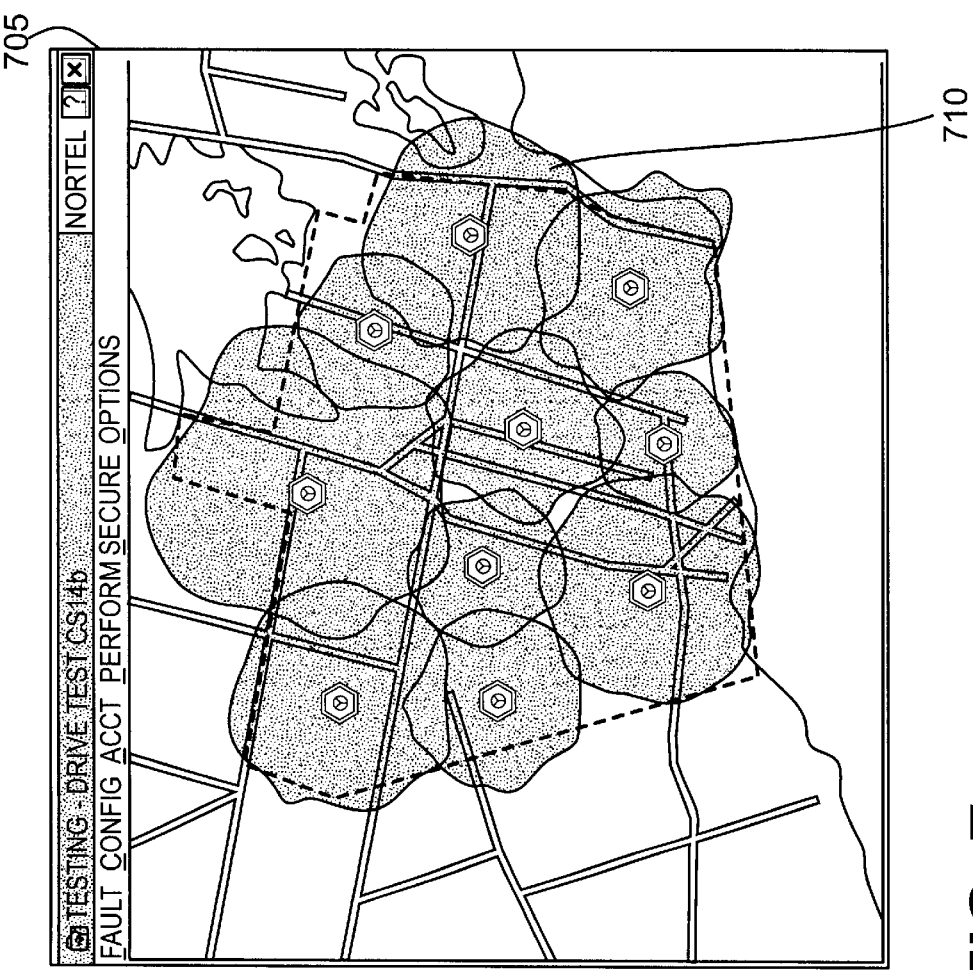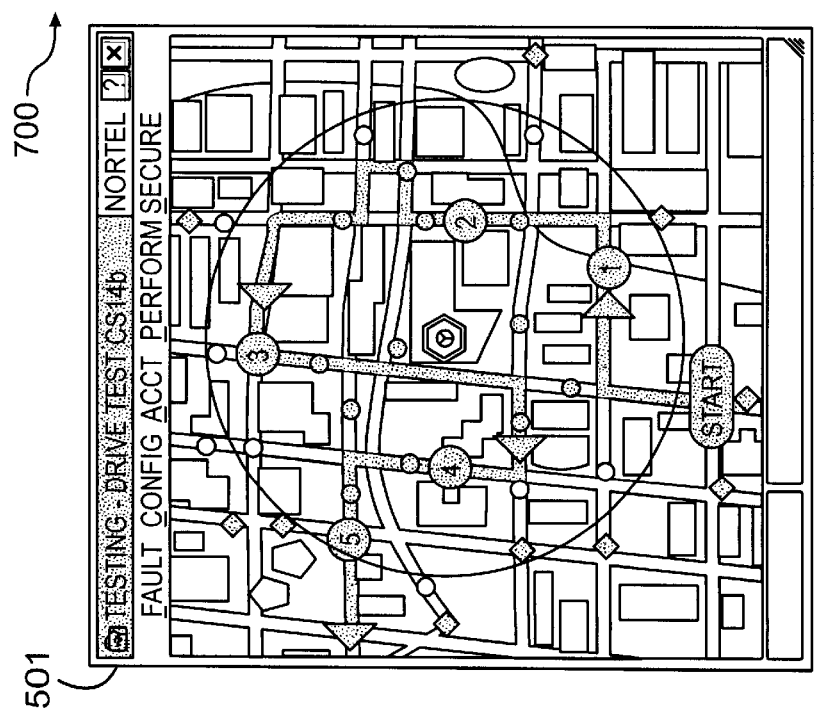
FIG. 7

TOOLS FOR WIRELESS NETWORK PLANNING

RELATED APPLICATIONS

This application is related to U.S. patent application, Ser. No. 09/001,626, filed Dec. 31, 1997, entitled WIRELESS TOOLS FOR DATA MANIPULATION AND VISUALIZATION; and U.S. patent application, Ser. No. 09/002,009, filed Dec. 31, 1997, entitled TOOLS FOR DATA MANIPULATION AND VISUALIZATION, which are incorporated herein by reference.

BACKGROUND OF THE INVENTION

The present invention relates generally to wireless networks, and more particularly to software tools with accompanying apparatus for planning, testing, and operating a cellsite in a wireless network.

The evolution of wireless communication technology has created a reliance on cellular phones, and more recently, personal communication systems (PCS) that allow a user to make a telephone call or check e-mail from virtually anywhere in the world. Such a system generally consists of a network of cells, that is, geographical service areas covered by a single antenna or group of antennas in which cellular phone users can receive a variety of communication services (e.g., voice and data communication services). The antennas for one or more cells are located at a cellsite.

Radio frequency characteristics (e.g., RF propagation) define the area of coverage for the cells. For example, an urban service provider may use one cell to provide wireless communication services to subscribers for a ten-block radius, while a rural provider may use one cell for an area of several square miles. To provide this coverage, service providers typically position antennas at the highest point of the cellsite (e.g., by using a cellsite tower) to facilitate RF coverage for the corresponding geographical area. The antenna then connects to an RF transmitter and receiver to carry voice or data signals between the cell and subscriber.

Some service providers use omni-directional antennas which provide 360 degrees of RF coverage for the cell while others may use directional antennas that provide RF coverage only for a sector of the cell. A sector is a geographical area, having a distinct size and shape, covered by a single antenna. For example, a service provider may use several antennas to provide 360 degrees of RF coverage for a cell. Antenna selection usually depends on the carrier interface used by the service provider (e.g., time division multiple access (TDMA), code division multiple access (CDMA), and global system for mobile (GSM)). The carrier interface typically determines the number of voice or data channels supported by the cell.

With the growing demand for more powerful and "user-friendly" wireless communication devices, service providers are adding new systems or constantly upgrading their existing systems to maintain market share. Such upgrading transition may include adding equipment and other resources to their system to accommodate more users and provide better service coverage for subscribers. To accomplish this task, service providers often solicit bids from contractors who must go through a lengthy process to prepare a bid for the project, install cellsite equipment (after a successful bid), and test RF propagation for a cell to ensure optimal service coverage. When adding equipment to an existing cellsite or while planning a new cellsite, these contractors often run into problems.

One problem is the time and resources necessary to plan and operate a cellsite. For example, after generating a network plan, contractors have to locate equipment needed to implement the plan. Until appropriate equipment is located, ordered and delivered, contractors often have to spend a considerable amount time integrating their network plans with non-existing equipment. Moreover, when upgrading or planning a wireless network, some contractors have difficulty locating a single source for product information that identifies best-in-class equipment, describes equipment functionality and compatibility, and provides equipment cost models for different network plans.

Another problem experienced by contractors is the difficulty in determining the actual RF propagation of an antenna in a cell and where to place additional antennas within the cell to minimize "dead spots." By obtaining this information, technicians can strategically place or tune antennas within the cell to improve RF propagation and thus enhance the service coverage area of the cell.

A further problem experienced by contractors, and more importantly, service providers, is the inability to view cellsite RF propagation data in real-time after the actual RF propagation for a cell is determined. The ability to view RF propagation data in real-time allows the contractor and service provider to identify service coverage problems and make appropriate modifications. This function is particularly important when service coverage in certain high volume areas of the cell is weak. Currently, service providers must use trial and error techniques to improve service coverage, such as manually adjusting one or more antennas at the cellsite and testing the RF propagation for each adjustment until the desired service coverage is reached.

In addition, service providers typically are unable to locate subscribers within a cell. This problem makes it difficult for service providers to effectively plan network capacity and adhere to E-911 regulations, which are expected to be mandatory in the near future. To ensure that one or more cells can provide adequate coverage, service providers should have knowledge of the volume of subscribers within a cell, the subscribers' location, the subscribers' traffic patterns, and problem areas. Knowing where subscribers are located within a cell can be useful when a subscriber is in an emergency situation and needs help immediately (e.g., dials 911).

Therefore, it is desirable to access comprehensive wireless network product information through a single source that identifies best-in-class equipment, describes equipment functionality and compatibility, and provides equipment cost models for different network plans.

It is also desirable to determine optimal driving routes within a cell to test the actual RF propagation of the cell.

It is further desirable to view cellsite RF propagation data combined with a subscriber's location within a cell in real-time.

Finally, it is also desirable to use subscriber location data for different periods of a day to effectively plan network capacity.

SUMMARY OF THE INVENTION

Systems and methods consistent with the present invention meet these desires by providing software tools with accompanying apparatus for planning, testing, and operating a cellsite in a wireless network.

Specifically, a network management software tool suite for planning, testing and operating a cellular network, comprises means for automatically generating product information corresponding to equipment identified in a proposed cellular network plan;

means for determining a drive test route through a cell of the cellular network to test RF propagation within the cell after the equipment is installed in the cellular network; means for displaying RF propagation data gathered during a drive test to illustrate actual RF propagation within the cell; and means for graphically representing the location of a user in the cell and the RF propagation simultaneously on a display.

A method for planning, testing and operating a cellular network comprises automatically generating product information corresponding to equipment identified in a proposed cellular network plan; determining a drive test route through a cell of the cellular network to test RF propagation within the cell after the equipment is installed in the cellular network; displaying RF propagation data gathered during a drive test to illustrate actual RF propagation within the cell; and graphically representing the location of a user device within the cell and actual RF propagation on a display.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings:

FIG. 3b is an image generated by the software tool of FIG. 3a;

FIG. 3c is an image generated by the software tool of FIG. 3a;

FIG. 7 is a series of images generated by a software tool consistent with the present invention that graphically represents actual RF propagation determined by drive tests through the drive test routes of FIG. 5;

FIG. 9b is an image generated by a software tool consistent with this invention that graphically represents customer usage areas associated with the user device location software tool of FIG. 9a.

DETAILED DESCRIPTION OF THE INVENTION

Embodiments consistent with the present invention are directed to software tools for wireless cellular network planning, such as an automated product information tool, an automated drive test route tool, a simulated RF propagation tool, and a user location tool. Each of these tools preferably includes one or more graphical user interfaces that are adaptable to a variety of applications relating to telecommunications, medicine, geography, or any other field that involves organizing, managing, and manipulating large amounts of complex data. For implementation purposes, the software tools described herein are directed to wireless communications technology, and more particularly, to cellular network planning, testing, and management systems for cellsites employing wireless communications technology. Where appropriate, alternative embodiments consistent with the present invention are described herein to identify other applications for the software tools. The alternative embodiments provide only a few examples of software tool applications and are not intended to be comprehensive.

Figure 1:
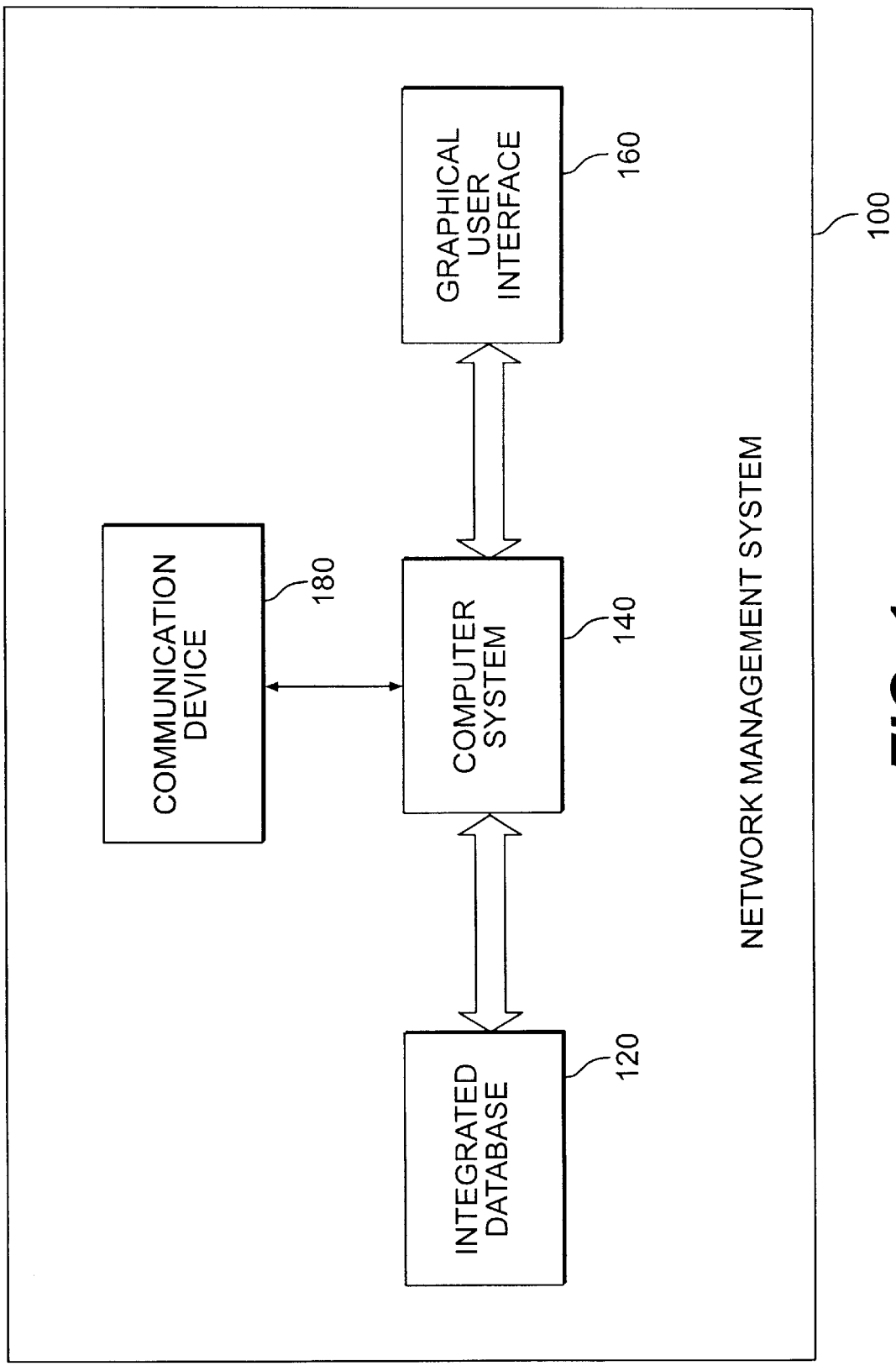
FIG. 1 is a block diagram of a network management system consistent with the present invention.

FIG. 1 illustrates a network management system 100 consistent with the present invention. Network management system 100, located remotely or at a cellsite, provides a user (e.g., network manager) with the ability to graphically represent cellsite planning and operation using one or more of the above-noted software tools. The system includes an integrated database 120, a computer system 140, a graphical user interface 160, and a communication device 180.

Database 120 includes a variety of data corresponding to a cellsite and the service area of the cellsite (e.g., topographical data, architectural data, network connectivity data, end user data, and RF propagation and other performance data). Database 120 preferably resides on a memory device (not shown), such as a hard drive, for storing large amounts of information. Data that is stored in database 120 may be updated or modified in any manner to maintain current cellsite information. In addition, database 120 may be expanded to accommodate additional information corresponding to one or more cellsites. Preferably, database 120 stores cellsite data in an integrated format to allow a user to retrieve and view different categories or types of cellsite data simultaneously. The data may include two-dimensional images (e.g., maps, plans, and photographic images), three-dimensional images (e.g., architectural clutter, and mechanical surface geometry), and operational measurements (e.g., data streams and formulas).

Computer system 140 is a high performance computer capable of processing complex graphical information. To achieve high performance, computer system 140 preferably includes a Pentium® processor (or equivalent) or greater, a memory, such as random access memory, and a high resolution display. Computer system 140 may be a stand-alone computer or may be connected to a network with high performance capabilities (e.g., 100 base-t or ATM25). In addition, computer system 140 supports platform independent languages, such as the Java™ programming language and the hypertext markup language (HTML), for Internet-based applications. Commercially available simulator software, such as software developed by Paradigm Simulations, Inc., can be executed on computer system 140 to simulate or graphically represent data received from database 120. The simulated data can be generated as transparent layers on a display of computer system 140 using graphical user interface 160.

Graphical user interface 160 is a software program executed by computer system 140 that allows a user to manipulate data viewed on the display of computer system 140. Each software tool described herein uses a graphical user interface for data manipulation. To facilitate data manipulation, a mouse, keyboard, or other similar input device may be used. Graphical user interface 160 allows a user to interact with displayed data to change conditions or operations of the cellsite. Preferably, graphical user interface 160 is user-friendly (e.g., Windows-based) to allow the user to retrieve, manipulate, and display cellsite information effectively on computer system 140 by simply selecting or controlling one or more icons using an input device. In addition, graphical user interface 160 may operate as a webpage for Internet-based applications.

Communication device 180 communicates information between system 100 and a remote site. Specifically, communication device 180 retrieves information for storage, manipulation or simulation (e.g., RF propagation data) and sends system 100 information to remote locations. For example, when a network engineer makes simulated changes to a cellsite antenna on system 100, the changes can be communicated to the cellsite through communication device 180 for implementation. Communication device 180 can be a wireless or wireline device depending on the application environment of system 100.

Figure 2:
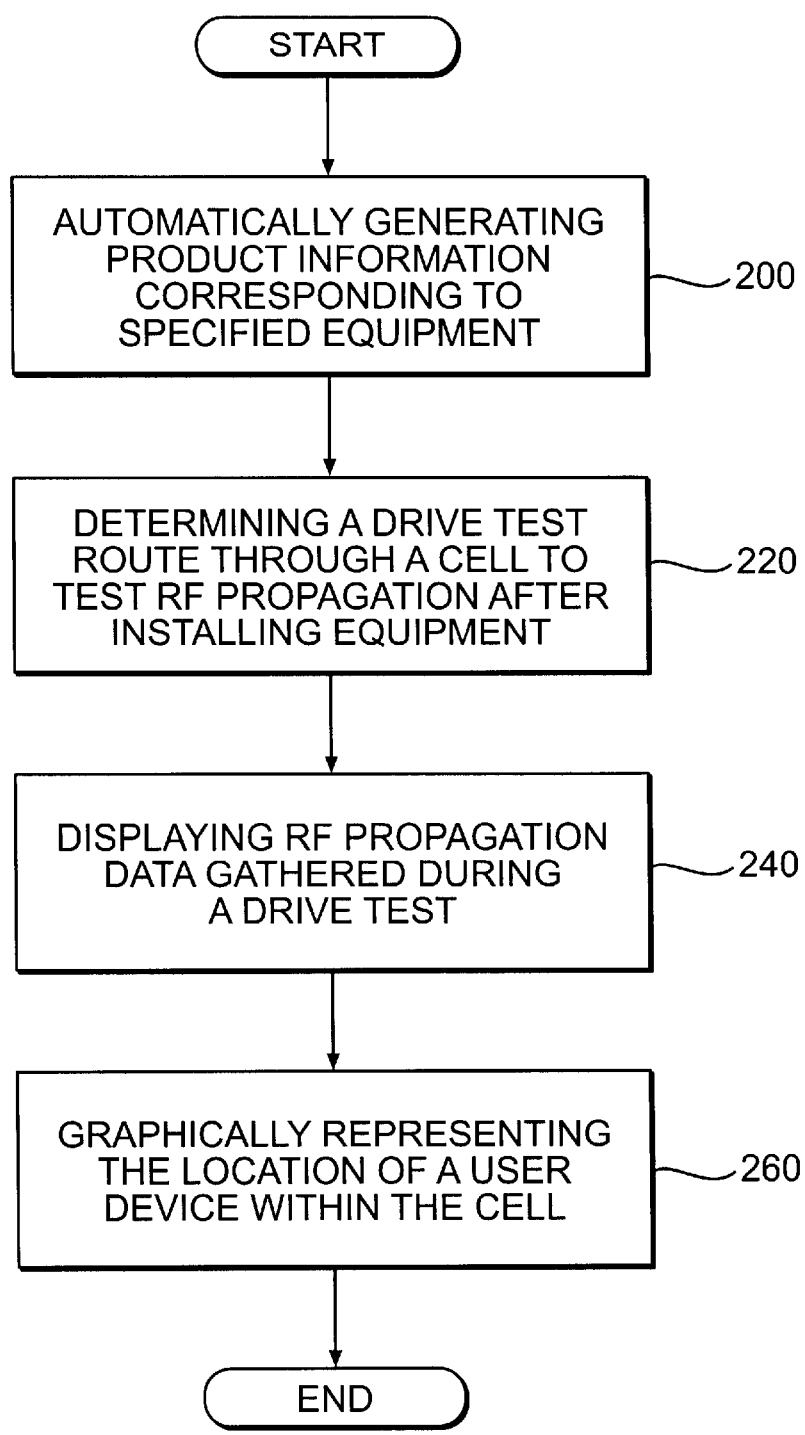
FIG. 2 is a flowchart of a method consistent with the present invention for graphically representing cellsite data for wireless network planning.

FIG. 2 is a flowchart of a method consistent with the present invention for planning, testing and operating a cellular network. The method begins with automatically generating product information corresponding to equipment identified in a proposed cellular network plan (step 200). This step involves displaying information about one or more vendors' products needed to implement a proposed cellular network plan. For example, if a contractor needs an antenna with certain power requirements, the contractor would type these requirements into computer system 140 (or click on an icon) which would then retrieve relevant product information from a local or remote database (e.g., server over the Internet).

The method of FIG. 2 continues with determining a drive test route through a cell to test RF propagation after installing cellsite equipment in accordance with a particular network plan (step 220). While technicians may have an idea of RF propagation for a cell based on the type of equipment installed at the cellsite and other factors (e.g., architectural interference), they must test actual RF propagation to ensure maximum service coverage. Network management system 100 allows technicians to determine optimal drive test routes through the cell to test actual RF propagation.

Once the technicians have driven along the determined drive test routes and have taken RF propagation measurements, they can display actual RF propagation data on computer system 140 (step 240). Using location technology, network management system 100 could also graphically represent the location of a user device (i.e., a communication device used by a subscriber to the service provider's network) along with actual RF propagation within the cell.

Figure 3A:
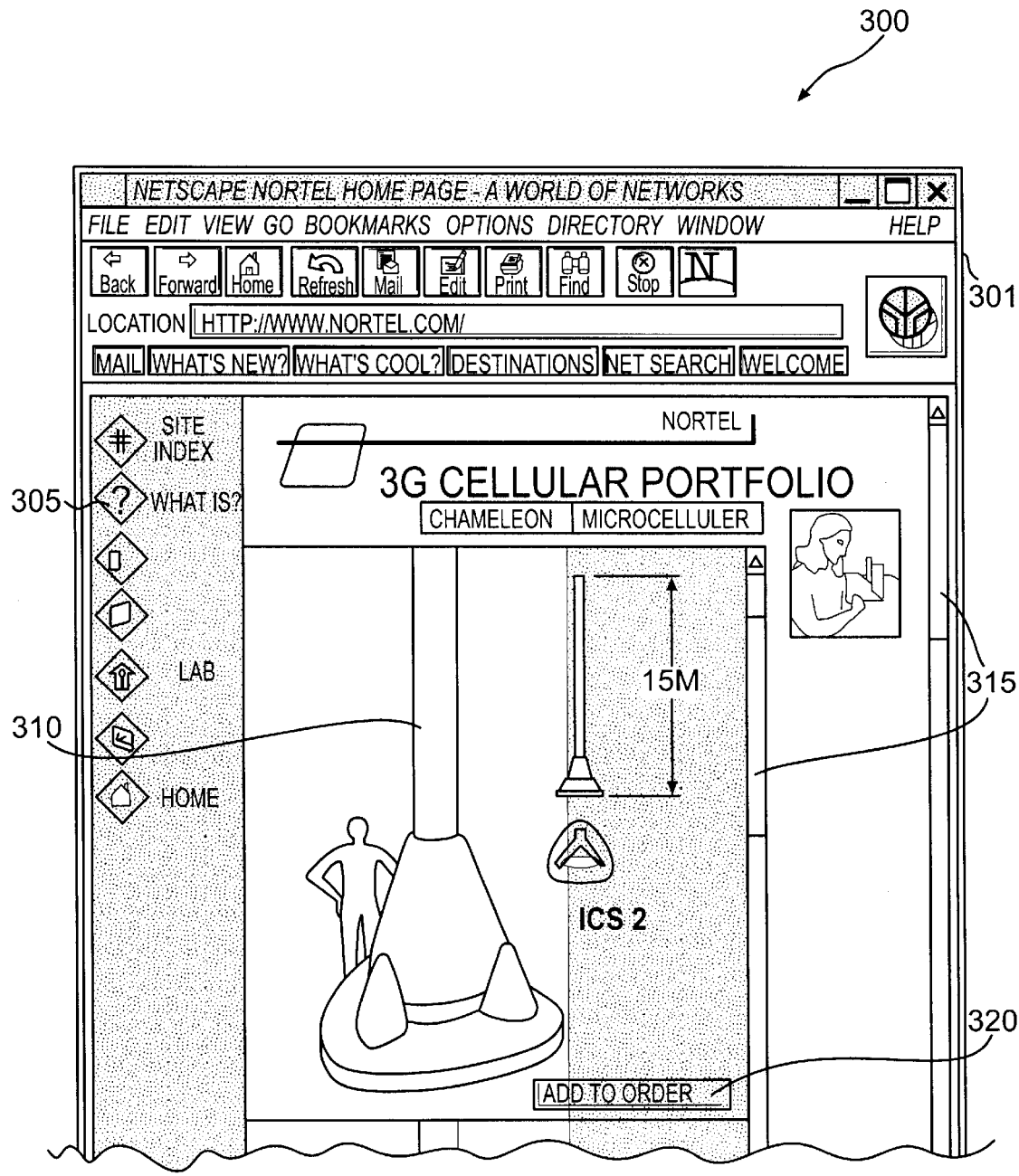
FIG. 3a is an image generated by a software tool consistent with this invention that graphically represents products for wireless network planning.
Figure 3B:
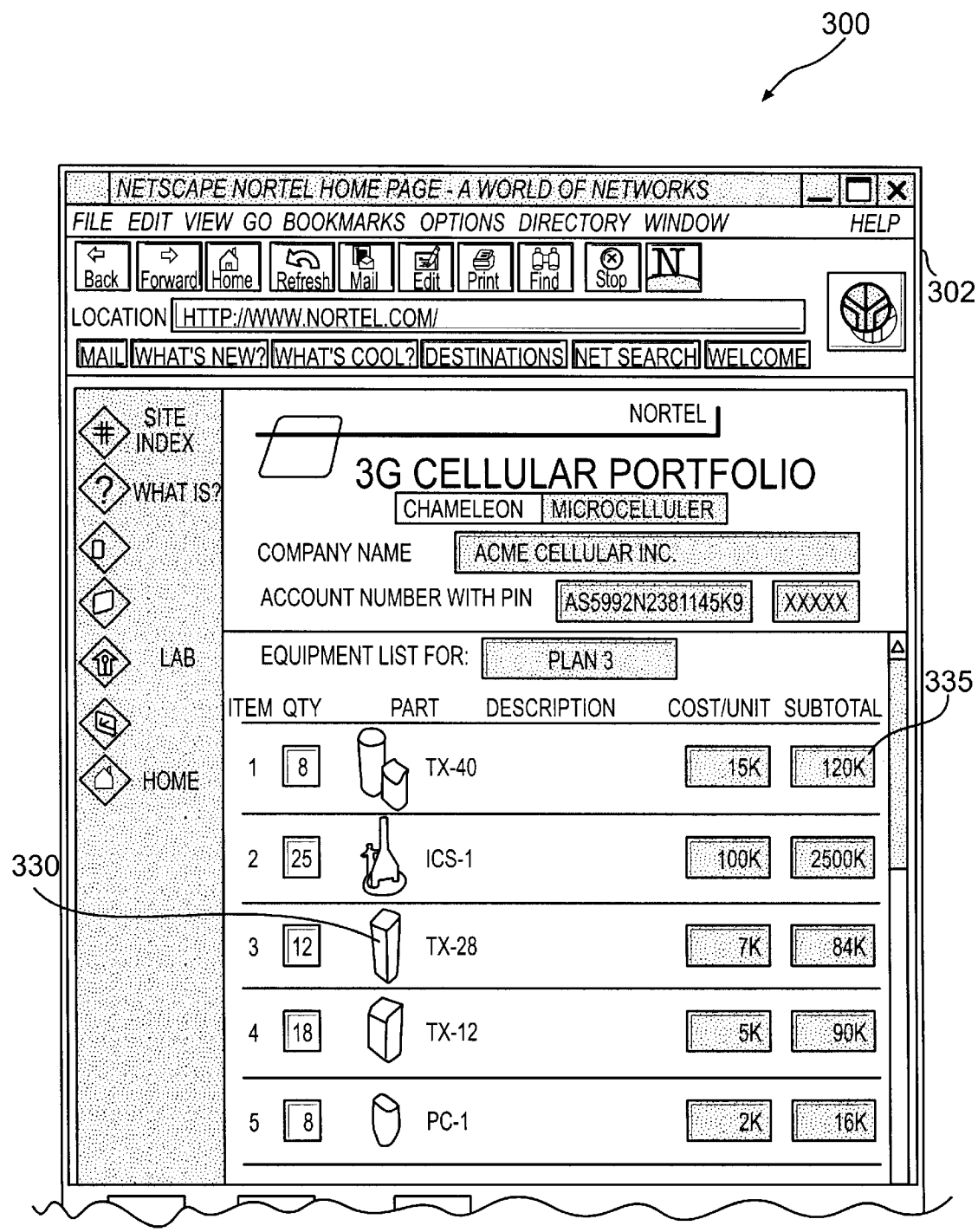
Figure 3C:
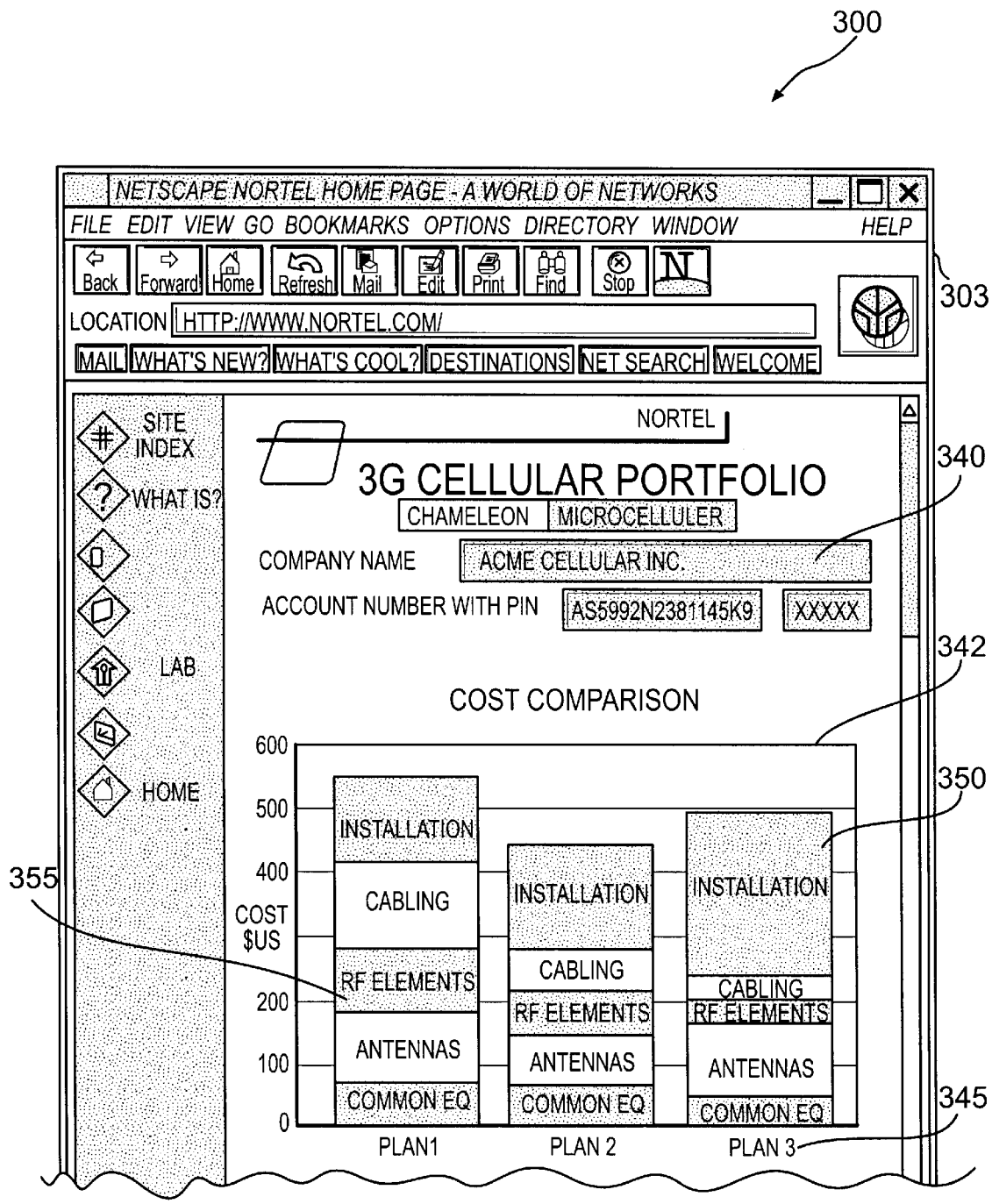

FIGS. 3a–3c represent images generated by a software tool 300 that graphically represents product information for wireless network planning. Preferably, software tool 300 is an HTML-based application that generates a graphical user interface with messaging windows for displaying product information from one or more vendors. In particular, FIGS. 3a–3c illustrate products and product information that a user (e.g., contractor) may need when planning or upgrading a wireless network. To this end, software tool 300 automatically generates parts lists, comparison charts, and cost models for equipment selected for a given network plan. Preferably, the product information includes current (i.e., continuously updated) vendor equipment information and inventory, cost models and financial data for each piece of vendor equipment, and equipment purchaser information. This product information can be retrieved from one or more server locations on the World Wide Web or from other available sources (e.g., CD-ROM).

FIG. 3a shows a graphical user interface 301 generated by software tool 300 to graphically simulate products for wireless network planning. As an example, graphical user interface 301 is shown as a webpage from the website of Nortel, the assignee of this application, and is accessible to any user with Internet access. When planning or upgrading a wireless network, a user can simply logon to a vendor's website that implements software tool 300 and view product information. Graphical user interface 301 provides vendor product descriptions and other information needed to match a particular product with a network plan. To manipulate this information, graphical user interface 301 includes service keys 305, product images 310, scrolling features 315, and ordering functions 320.

Service keys 305 are icons that provide a user with a variety of options relating to accessing information through a vendor's websites. For example, service keys 305 may include a site index key, vendor information key, or a special events key. Each of these keys is programmed to perform a specific function when selected by the user. Thus, the site index key would provide the user with a table of contents for the website and the vendor information key would provide general information about the vendor. One skilled in the art will appreciate that graphical user interface 301 may be configured to include any number of service keys for a specific user environment.

Product images 310 are graphical images of a product selected by the user. For example, if a user wishes to view cellsite antenna information at a vendor's website, software tool 300 allows the user to select one or more antennas offered by the vendor. When a particular antenna is selected, graphical user interface 301 shows one or more views of the selected antenna and also provides textual information describing certain features of the selected antenna. The vendor can configure their webpages in any format to show their product to potential customers. Thus, one vendor may user software tool 300 to generate a gallery of product images with little accompanying text while another vendor may emphasize the textual information with only a few product images.

Scrolling features 315 are typical to webpages and allow a user to scroll through large amounts of information. In this instance, scrolling features 315 allow a user to scroll through product information shown on graphical user interface 301. Scrolling features 315 are particularly helpful for images since they allow images larger than a single screen to be viewed by a user.

Ordering functions 320 are simulated keys on graphical user interface 301 which allow a user to order a product viewed on a vendor's webpage. For example, if a user is scrolling through cellsite antenna product information and wishes to purchase the product, he simply has to select the "ADD TO ORDER" key on the graphical user interface.

This selection adds the cellsite antenna product to any previously selected product listing.

FIG. 3b shows a graphical user interface 302 generated by software tool 300 to graphically represent product listings for wireless network planning. If a user wishes to view a listing of selected products along with a description and cost of each product, software tool 300 can generate graphical user interface 302 to simulate this information. As illustrated in FIG. 3b, a user can view a list of products 330 and cost totals 335 for each product. This feature of software tool 300 provides a user with a running cost total for each piece of equipment they choose to purchase. In addition, graphical user interface can be configured to provide a user with historical information regarding the user's account and/or the selected cellsite. This, the user can access information regarding equipment currently existing at a particular cellsite or information regarding equipment he has previously purchased from one or more vendors.

FIG. 3c shows a graphical user interface 303 generated by software tool 300 to graphically represent product comparisons associated with wireless network planning. When planning a network, a user is typically concerned about cost, quality of service, installation time, and other criteria that may be important for a particular user environment. Graphical user interface 303 is supported by an iterative cost model prediction tool that allows a user to generate or explore multiple network solutions from a proposed network plan. In addition, the iterative cost model prediction tool predicts costs for parts and equipment needed to implement each solution. To facilitate this operation, graphical user interface 303 includes a user identification field 340 and a cost comparison chart 342 for multiple network plans that may or may not include similar equipment. For example, FIG. 3c illustrates three network plan scenarios 345 and provides a cost comparison for each plan. In addition to cost, graphical user interface 303 compares other parameters 350 including installation time, cabling, RF elements, antennas, and common equipment hardware. The three network plans are graphically represented using distinctly colored layers 355 to provide an easy-to-read analysis chart. When the user is finished selecting products, he can complete a customized order form for his selected products, and purchase the products using commercial retail methods.

Figure 4:
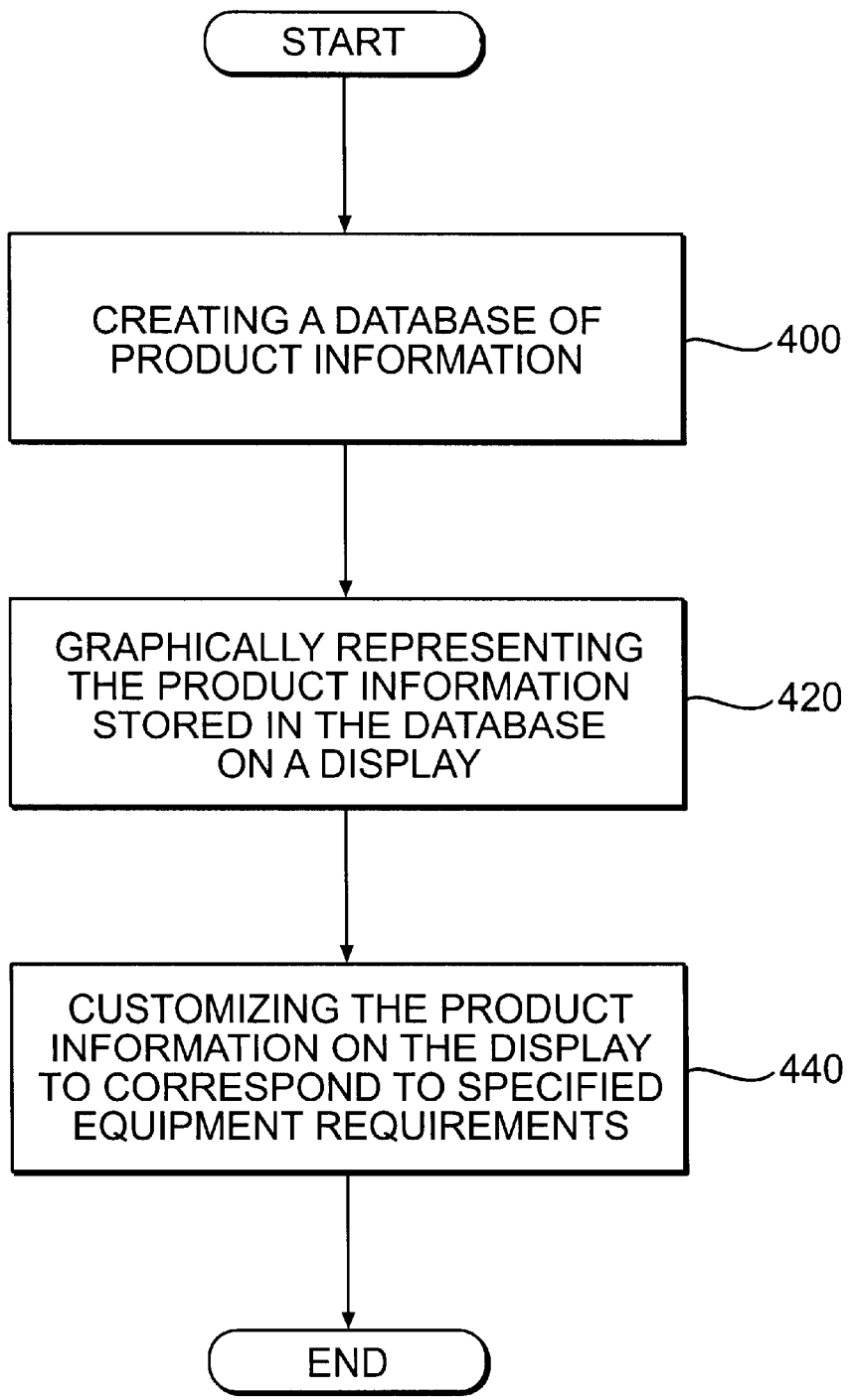
FIG. 4 is a flowchart of a method consistent with the present invention for graphically representing product information for wireless network planning.

FIG. 4 is a flowchart of a method consistent with the present invention for graphically representing product information associated with wireless network planning. The method begins with creating a database of product information (step 400). The product information can be accessed through vendor websites that implement software tool 300, or can be electronically or manually entered into the database. After creating the database, a graphical user interface is implemented on a display of computer system 140 to graphically represent the product information (step 420). Finally, the product information can be customized and manipulated to generate different categories of product information that correspond to specified equipment requirements in a proposed cellular network plan (step 440), as shown in FIGS. 3a–3c.

Figure 5:
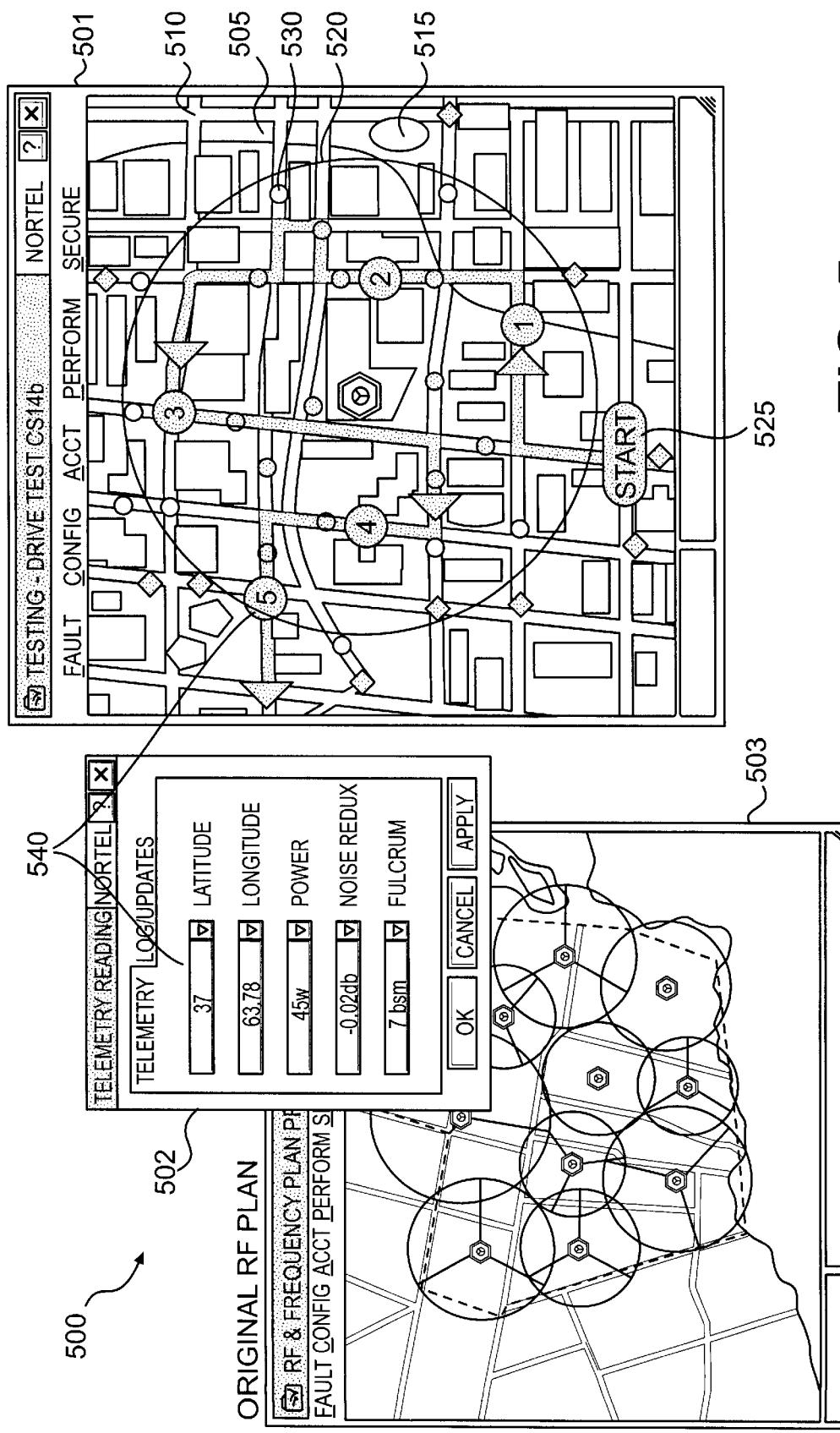
FIG. 5 is a series of images generated by a software tool consistent with this invention that graphically represents drive test routes within a cellsite for testing actual RF propagation of the cell.

FIG. 5 is a series of images generated by a software tool 500 that graphically represents drive test routes within a cell for wireless network planning. When planning wireless networks, users would like to gather RF propagation data to ensure that one or more cellsite antennas are tuned to provide the broadest service coverage. Once a contractor, for example, installs equipment at a cellsite, he needs to test the equipment to determine actual RF propagation within the cell. Traditional methods to determine RF propagation have been time consuming and often very costly. Software tool 500, however, allows technicians to generate a simulated, optimal drive test route within the cell to best determine actual RF propagation. This simulation may include remote real-time monitoring of antenna signal strength while the technician is performing the drive test through the cell.

Drive test routes are graphically represented on computer system 140 using cell information either stored in database 120 or received in real-time over a remote link through communication device 180. The cell information used to represent drive test routes through a cell includes topographical data 505, street map data 510, architectural clutter data 515, planned RF coverage data 520, global positioning system (GPS) mapping data 525, and user location data 530, as shown on graphical user interface 501. One skilled in the art will appreciate that other data, such as RF coverage interference data, may be used when generating drive test routes in accordance with embodiments consistent with the present invention.

Topographical data 505 provides a topographical view of the geographical area covered by one or more cells. Street map data 510 provides an aerial view of streets within and around the cell. Architectural clutter data 515 provides an aerial view of buildings and other similar architecture located in or around the cell. Planned RF coverage data 520 provides a topographical view of planned RF coverage for a cell. Computer system 140 displays planned RF coverage data 520 as transparent to enable viewing of other cellsite information, such as topographical, architectural and street map data. GPS mapping data 525 provides the location of a technician driving along a drive test route though the cell at a given time. This data may be received in real-time over a GPS communication link or retrieved from database 120. User location data 530 identifies the location of a user within the cell at a particular time. This data is represented as a sphere in FIG. 5.

In one embodiment consistent with the present invention, using GPS hardware (or other location technology hardware) on a vehicle, a technician can drive through streets within a cell and communicate position and telemetry readings 540 back to computer system 140 in real-time. The technician can also measure signal strength while driving through the cell and communicate this information to computer system 140. The communicated position and telemetry readings 540 are measured at different locations along the drive test route and graphically represented in a graphical user interface 502 generated by software tool 500. As illustrated in FIG. 5, these readings include latitude, longitude, signal strength interference, power, and noise reduction information. A technician can repeat this procedure for other cells in a planned wireless communication network. The actual RF propagation coverage measured during the drive test can be compared to the predicted RF propagation coverage illustrated in a graphical user interface 503. A display of the actual RF propagation for one or more cells can be generated in the manner described below with regard to FIG. 7.

Figure 6:
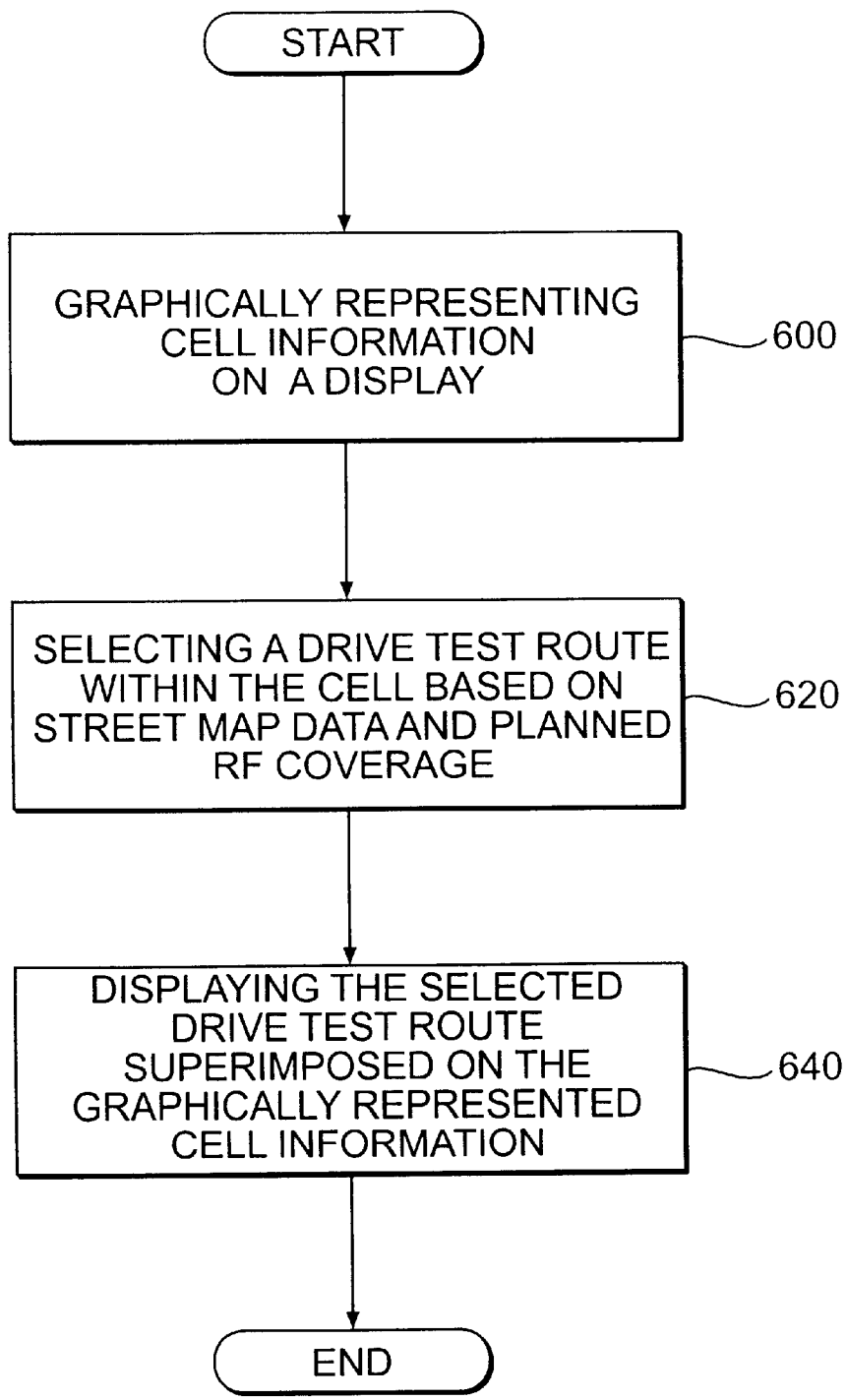
FIG. 6 is a flowchart of a method consistent with the present invention for graphically representing drive test routes within a cellsite for wireless network planning.

FIG. 6 is a flowchart of a method consistent with the present invention for graphically representing drive test routes within a cell for wireless network planning. The method begins with graphically representing cell information on a display (step 600). As discussed above, the cell information may include topographical data, street map data, architectural clutter data, planned RF coverage data, planned RF coverage interference data, GPS mapping data, and user location data. This data may be obtained by conventional methods and stored in a database. Once the cell information is graphically represented, computer system 140 implements a graphical user interface to select an optimal drive test route through the cell based on street map data and planned RF coverage data (step 620). Drive test route selection is based on the proximity of a street to an antenna at a cellsite and may take into account possible architectural clutter interference and potential high traffic areas within the cell. The proposed drive test route should cover a broad area to effectively measure signal strength within the cell. Computer system 140 displays the selected drive test route superimposed on the graphically represented cell information (step 640).

FIG. 7 is a series of images generated by a software tool 700 that graphically represents actual RF propagation measured along the drive test route shown in FIG. 5. Essentially, software tool 700 uses data measured by technicians during the drive test to generate a graphical user interface 705 that shows actual RF propagation 710 for one or more cells. Thus, the user can rely on real-time data to graphically represent actual RF propagation views for each cell of a cellular network. To generate graphical user interface 705, computer system 140 converts the actual RF propagation measurements gathered by technicians during the drive test into visual images using software tool 700. These visual images may be generated using measured RF propagation boundary data (also generated during the drive test), cell information, and actual RF propagation data.

Figure 8:
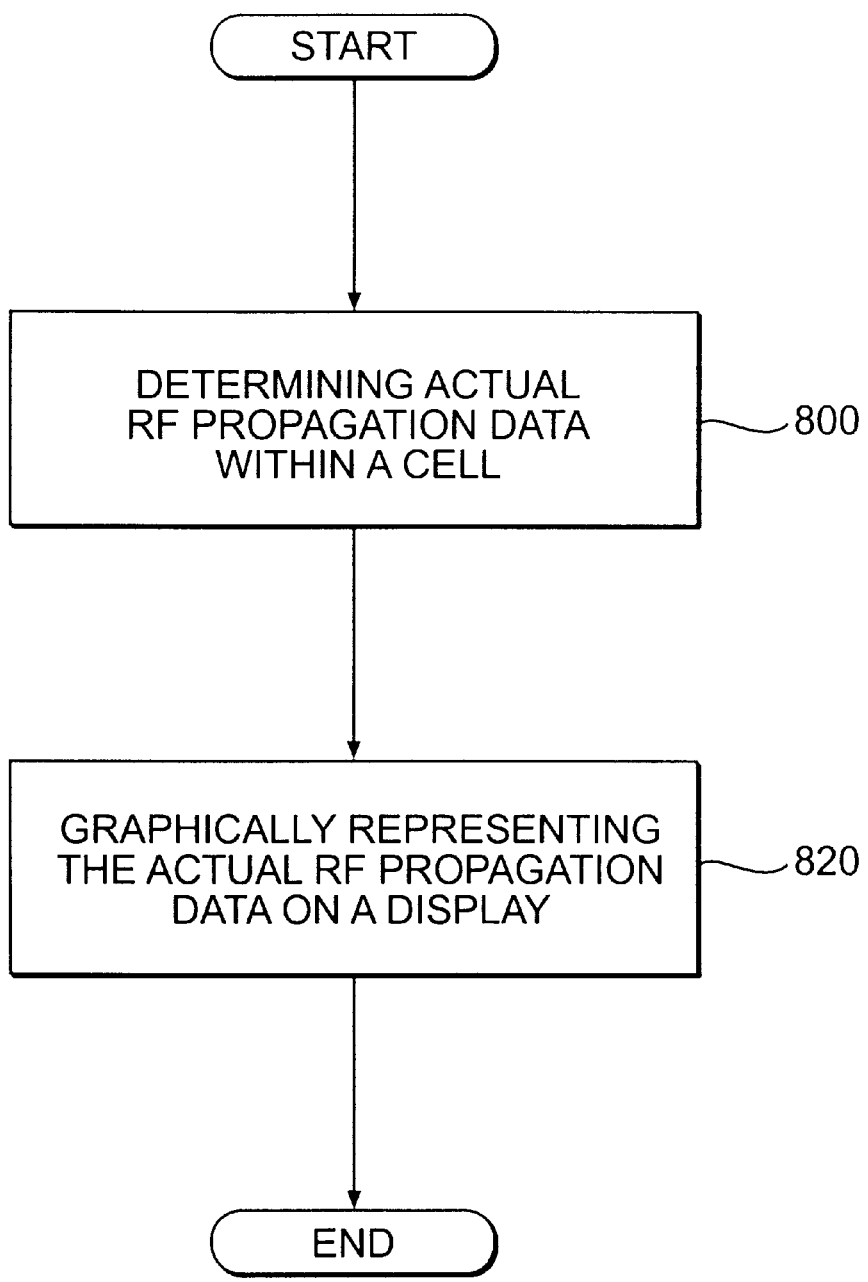
FIG. 8 is a flowchart of a method consistent with the present invention for graphically simulating RF propagation for wireless network planning.

FIG. 8 is a flowchart of a method consistent with the present invention for graphically representing RF propagation for wireless network planning. The method begins with determining actual RF propagation within a cell (step 800). As described above, the actual RF propagation is measured during drive tests through the cell. Once the actual RF propagation is determined, it is graphically represented on a display along with other cell information. The cell information may include topographical data, street map data, architectural clutter data, and GPS mapping data.

Figure 9A:
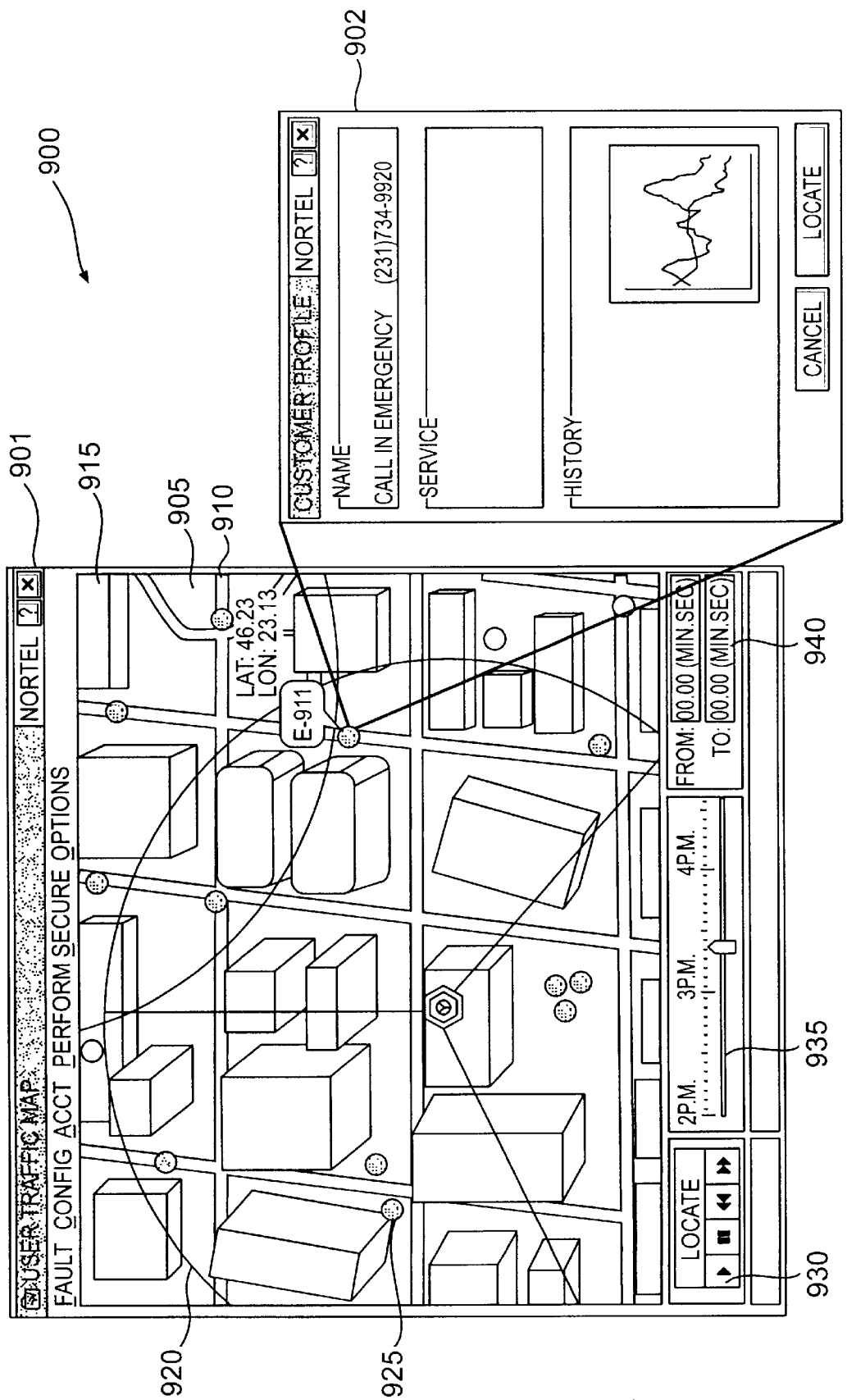
FIG. 9a is a series of images generated by a software tool consistent with this invention that graphically simulates user device location information.
Figure 9B:
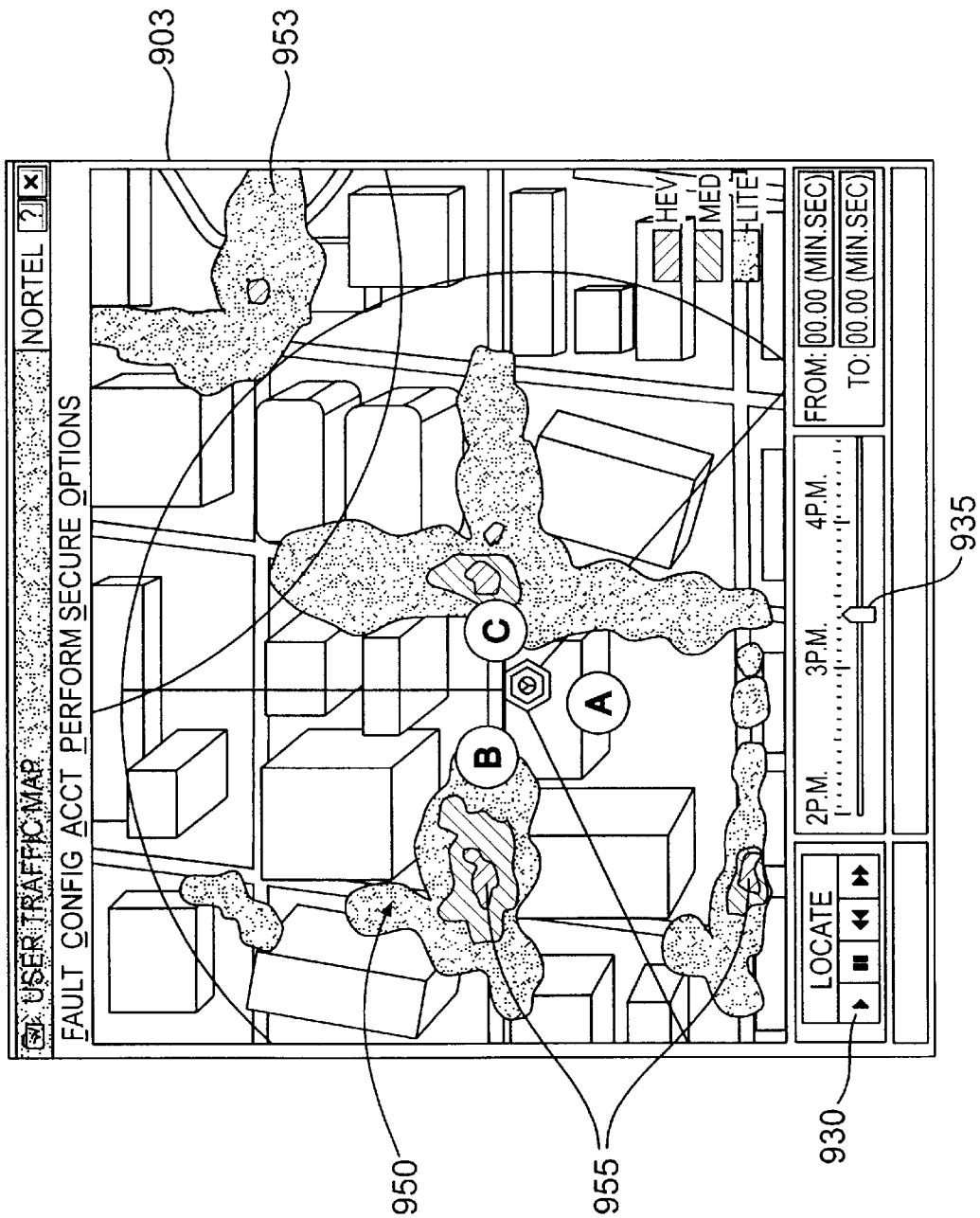

FIGS. 9a and 9b illustrate software tools for graphically representing user device locations and customer usage within a cell. These software tools allow a user to monitor end user locations within a cell and monitor end user traffic patterns as well. This information allows a service provider to effectively plan network capacity and quickly identify problem areas within one or more cells of the network.

FIG. 9a is a series of images generated by a software tool 900 that graphically represent user device location information for wireless network planning. Software tool 900 includes a graphical user interface 901 for graphically representing topographical data 905, street map data 910, architectural clutter data 915, RF coverage data 920, and user device location and performance data 925 stored in a database or received over a communication link. Weather condition information may also be retrieved and simulated on graphical user interface 901 using weather measuring techniques (e.g., Doppler radar). A user can manipulate the images generated by graphical user interface 901 using locate buttons 930 and sliding time bar 935.

Locate buttons 930 include play, stop, fast forward, and reverse buttons for simulating cellsite data over a period of time (e.g., from 3:15 P.M. to 3:20 P.M.). The time period may be adjusted using sliding time bar 935. This feature allows a user to quickly move between time periods by dragging the timing bar left or right. The time period is displayed to the user through timing window 940.

For each user device location (illustrated as spheres in graphical user interface 901), software tool 900 can generate a graphical user interface 902 that displays a profile of user information. This information can be obtained from user service profile databases which include personal information of telephone users necessary for emergency situations. Thus, when a user dials "911" on a wireless communication device, software tool 900 can be used by service providers to view a subscriber's exact location within a cell (e.g., street names, building numbers, and floor levels).

FIG. 9b is an image generated by software tool 900 for graphically representing customer usage areas associated the user device location software tool of FIG. 9a. By tracking the location of user devices within a cell, the service provider can determine light, medium, and high usage areas within a cell measured over a set time period. Computer system 140 can generate a graphical user interface 903 to represent this information on a display. Specifically, graphical user interface 903 shows customer usage areas 950 as clouds. Lighter clouds 953 represent light customer usage areas while darker clouds 955 represent heavy customer usage areas within a cell. The clouds may also represent other cell conditions such as dropped or failed call attempts. Software tool 900 can be programmed to simulate any type of condition associated with a cell. Using locate buttons 930 and sliding time bar 935, a user can simulate these conditions on graphical user interface 903 over a specified period of time.

Figure 10:
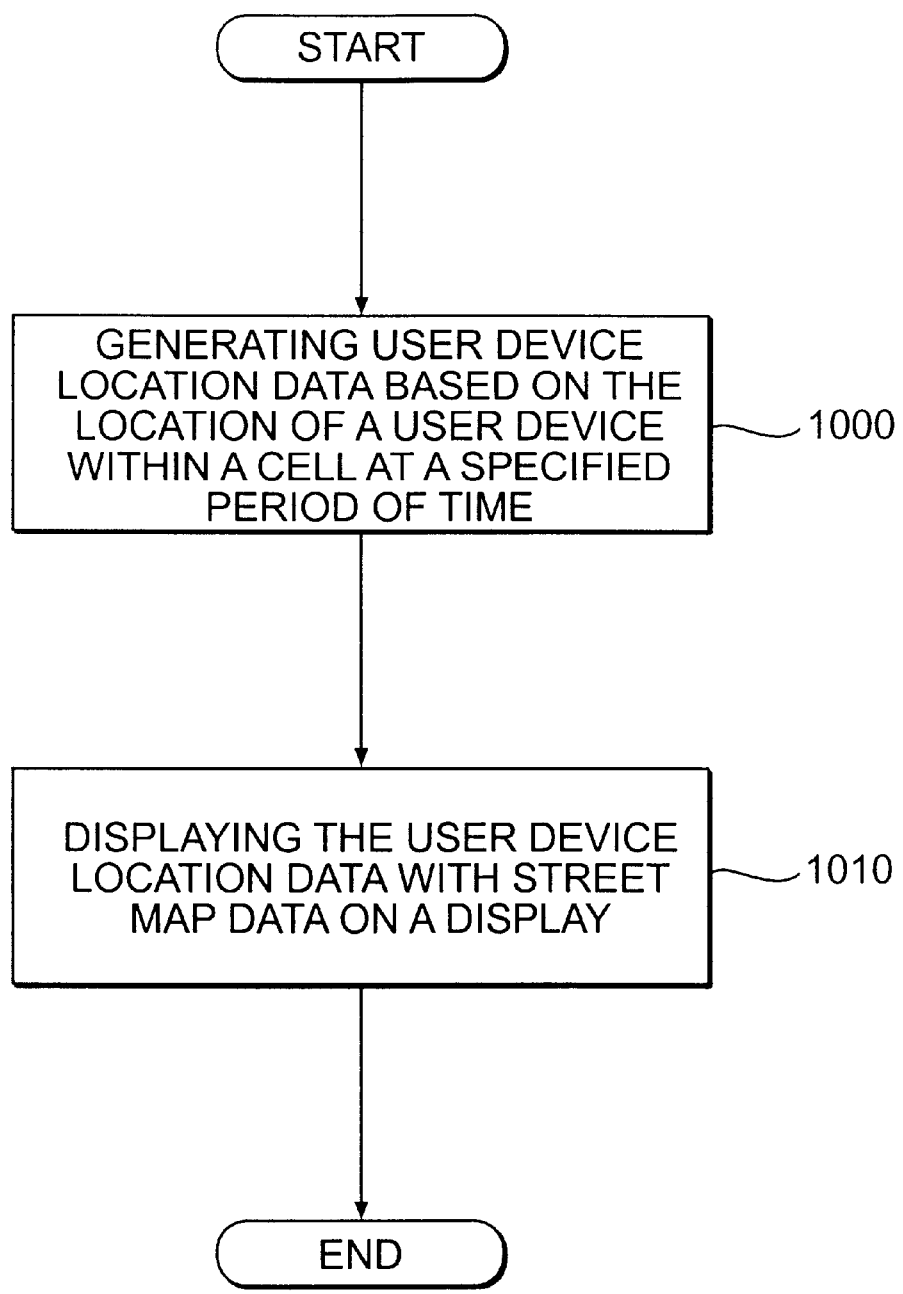
FIG. 10 is a flowchart of a method consistent with this invention for graphically simulating user location information.

FIG. 10 is a flowchart of a method for graphically representing user device location information for wireless network optimization. The method begins with generating user device location data based on the location of a user device within a cell at a specified period of time (step 1000). After the user device location is generated, computer system 140 displays the user device location data with street map data or other cell information (step 1010). The user device location data allows a service provider to monitor customer usage areas within the cell. In addition, the user device location data can be compared with areas of known poor coverage to determine user traffic within those areas.

Embodiments consistent with the present invention provide software tools that facilitate immediate access to comprehensive wireless network product information relating to equipment functionality and compatibility as well as product cost models. These tools can also be used by to determine optimal test routes within a cell and to view actual RF propagation data within a cell in real-time. In addition, using these software tools, service providers can locate users within a cell and effectively plan network capacity to provide optimal service coverage.

While only some embodiments and methods consistent with the present invention have been described, those skilled in the art will understand that various changes and modifications may be made to these embodiments, and equivalents may be substituted for elements in these embodiments, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A network management software tool suite for planning, testing and operating a cellular network, comprising:

means for automatically generating product information corresponding to equipment required in a proposed cellular network plan;

means for determining an optimum drive test route through a cell of the cellular network to test RF propagation within the cell after the equipment is installed in the cellular network;

means for informing a driver of the optimum drive test route:

means for displaying RF propagation data gathered during a drive test by the driver to illustrate actual RF propagation within the cell; and means for graphically representing the location of a user in the cell and the RF propagation simultaneously on a display.

2. The software tool suite of claim 1 wherein the informing means includes means for graphically representing at least one of topographical data, street map data, architectural data, user data, radio frequency coverage interference data, and radio frequency propagation data with drive test route data.

3. The software tool suite of claim 1 wherein the displaying means includes means for graphically representing at least one of topographical data, street map data, architectural data, user data, and radio frequency coverage interference data with the radio frequency propagation data.

4. The software tool suite of claim 1 wherein the graphically representing means includes means for graphically representing at least one of topographical data, street map data, architectural data, and RF coverage interference data with the user location data and the RF propagation data.

5. The software tool suite of claim 1 wherein the generating means includes means for scrolling through product information visually represented on a display.

6. The software tool suite of claim 1 wherein the generating means includes means for generating product information on a graphical user interface.

7. The software tool suite of claim 1 wherein the informing means includes means for generating drive test route information on a graphical user interface.

8. The software tool suite of claim 1 wherein the displaying means includes means for generating RF propagation data on a graphical user interface.

9. The software tool suite of claim 1 wherein the graphically representing means includes means for graphically representing the location of a user in the cell and the RF propagation data simultaneously on a graphical user interface.

10. A method for planning, testing and operating a cellular network, comprising:

automatically generating product information corresponding to equipment identified in a proposed cellular network plan;

determining a drive test route through a cell of the cellular network to test RF propagation within the cell after the equipment is installed in the cellular network;

informing a driver of the drive test route;

displaying RF propagation data gathered during a drive test by the user to illustrate actual RF propagation within the cell; and graphically representing the location of a user device within the cell and actual RF propagation on a display.

11. The method of claim 10 wherein informing includes graphically representing at least one of topographical data, street map data, architectural data, user data, radio frequency coverage interference data, and radio frequency propagation data with drive test route data.

12. The method of claim 10 wherein displaying includes graphically representing at least one of topographical data, street map data, architectural data, user data, and radio frequency coverage interference data with the radio frequency propagation data.

13. The method of claim 10 wherein graphically representing includes graphically representing at least one of topographical data, street map data, architectural data, and RF coverage interference data with the user location data and the RF propagation data.

14. The method of claim 10 wherein automatically generating includes scrolling through product information visually represented on a display.

15. The method of claim 10 wherein generating means includes means for generating product information on a graphical user interface.

16. The method of claim 10 wherein informing includes generating drive test route information on a graphical user interface.

17. The method of claim 10 wherein displaying includes generating RF propagation data on a graphical user interface.

18. The method of claim 10 wherein graphically representing includes graphically representing the location of a user in the cell and the RF propagation data simultaneously on a graphical user interface.

19. A method for automatically generating product information corresponding to equipment identified in a proposed cellular network plan, comprising:

creating a database of product information for a cellular network;

graphically representing the product information stored in the database on a display;

customizing the product information graphically represented on the display to correspond to specified equipment requirements; and permitting ordering of equipment in accordance with the customized product information.

20. The method of claim 19 wherein creating includes creating a database of product description information, product cost information, and product purchaser information.

21. The method of claim 19 wherein graphically representing includes implementing a hypertext markup language based graphical user interface configured to transfer product information via the Internet.

22. The method of claim 19 wherein graphically representing includes generating automated information update windows.

23. The method of claim 19 wherein graphically representing includes generating messaging windows.

24. The method of claim 19 wherein permitting ordering includes generating customized order forms.

25. The method of claim 21 further comprising processing an order via the Internet.

26. The method of claim 19 wherein graphically representing includes visually representing a comparison of product information for a plurality of proposed cellular network plans.

27. The method of claim 19 wherein graphically representing includes visually representing a comparison of installation time information for the plurality of network plans.

28. The method of claim 19 wherein graphically representing includes visually representing a comparison of cost information for the plurality of network plans.

29. The method of claim 19 wherein graphically representing includes implementing a graphical user interface to visually represent a product.

* * * * *